(12) United States Patent
Lee

(10) Patent No.: US 7,583,838 B2
(45) Date of Patent: Sep. 1, 2009

(54) COLOR SATURATION ADJUSTING APPARATUS AND METHOD USED FOR A DISPLAY SYSTEM

(75) Inventor: Jae-moon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 721 days.

(21) Appl. No.: 10/924,871

(22) Filed: Aug. 25, 2004

(65) Prior Publication Data
US 2005/0047657 A1 Mar. 3, 2005

(30) Foreign Application Priority Data
Aug. 25, 2003 (KR) .................. 10-2003-0058789

(51) Int. Cl.
*G06K 9/00* (2006.01)
(52) U.S. Cl. ..................................... 382/167
(58) Field of Classification Search ............ 382/167, 382/162
See application file for complete search history.

(56) References Cited

U.S. PATENT DOCUMENTS

| 4,183,047 | A | * | 1/1980 | Kim et al. ............ 348/648 |
| 4,602,276 | A | * | 7/1986 | Fling et al. ........... 348/646 |
| 4,721,951 | A | * | 1/1988 | Holler .................. 345/603 |
| 6,272,239 | B1 | * | 8/2001 | Colla et al. ............ 382/167 |
| 2002/0126893 | A1 | | 9/2002 | Held et al. |

FOREIGN PATENT DOCUMENTS

| JP | 08-076960 A | 3/1996 |
| JP | 09-179990 A | 7/1997 |
| JP | 2001-251530 A | 9/2001 |
| JP | 2002-149149 A | 5/2002 |
| JP | 2002-175538 A | 6/2002 |

* cited by examiner

*Primary Examiner*—Vikkram Bali
*Assistant Examiner*—Eueng-Nan Yeh
(74) *Attorney, Agent, or Firm*—Sughrue Mion, PLLC

(57) ABSTRACT

A color saturation adjusting apparatus is provided for use in a display system, including an RGB-HSV conversion unit, a color saturation adjusting function setting unit, a color saturation adjusting unit and an HSV-RGB conversion unit. The RGB-HSV conversion unit receives an input RGB image signal and converts RGB values of the input RGB image signal into corresponding HSV values. The color saturation adjusting function setting unit sets a color saturation adjusting function in response to key input of a user. The color saturation adjusting unit generates new HSV values in which color saturation values are varied from the color saturation values of the original HSV values by using the color saturation adjusting function. The HSV-RGB conversion unit converts the new HSV values obtained by the color saturation adjusting unit into corresponding RGB values and outputs the RGB values.

14 Claims, 4 Drawing Sheets

COLOR SATURATION ADJUSTING APPARATUS AND METHOD USED FOR A DISPLAY SYSTEM

BACKGROUND OF THE INVENTION

This application claims priority from Korean Patent Application No. 2003-58789, filed on Aug. 25, 2003, in the Korean Intellectual Property Office, the disclosure of which is incorporated herein in its entirety by reference.

1. Field of the Invention

The present invention relates to a color saturation adjusting apparatus and method used for a display system, and more particularly, to a color saturation adjusting apparatus and method capable of selectively and differently adjusting color saturation values of desired colors but not entire colors displayed on a screen.

2. Description of the Related Art

In general, a color displayed on a screen of a display system can be represented with three parameters: brightness; hue; and color saturation. The brightness corresponds to an intensity or amplitude of light (color). The hue corresponds to a dominant wavelength of light (color). The color saturation corresponds to a purity or bandwidth of light (color). The color saturation is sometimes referred to as chroma.

In a conventional display system, a user can adjust the brightness and the color saturation out of the three parameters in order to obtain his favorite colors. Unfortunately, color saturation values for desired colors are not selectively adjusted. That is, all the color saturation values for the entire colors increase or decrease by the same amount. For example, since color saturation values of red-like colors and blue-like colors increase or decrease by the same amount, a user preferring red-like colors to blue-like colors and another user preferring blue-like colors to red-like colors are not satisfied with the conventional color saturation adjustment. In addition, in a case where a source image has an unbalance in colors, for example, in a case where color saturation values of red-like colors are excessively high, it is impossible to obtain balance of colors by the conventional color saturation adjustment in which the color saturation values of all colors increase or decrease by the same amount.

SUMMARY OF THE INVENTION

A color saturation adjusting apparatus and method are provided for selectively and differently adjusting color saturation values of desired colors to satisfying all the users having different color preference.

A color saturation adjusting apparatus and method are provided for selectively and differently adjusting color saturation values of desired colors, so that a user can correct unbalance in colors of a source image.

According to an exemplary embodiment of the present invention, there is provided a color saturation adjusting apparatus used for a display system, comprising: an RGB-HSV conversion unit receiving an input RGB image signal and converting RGB values of the input RGB image signal into corresponding HSV values; a color saturation adjusting function setting unit setting a color saturation adjusting function in response to key input of a user; a color saturation adjusting unit generating new HSV values in which color saturation values are varied from the color saturation values of the original HSV values by using the color saturation adjusting function; and an HSV-RGB conversion unit converting the new HSV values obtained by the color saturation adjusting unit into corresponding RGB values and outputting the RGB values.

According to another exemplary embodiment of the present invention, there is provided a color saturation adjusting method used for a display system, comprising: receiving an input RGB image signal; converting RGB values of the input RGB image signal into corresponding HSV values; setting a color saturation adjusting function; generating new HSV values in which color saturation values are varied from the color saturation values of the original HSV values by using the color saturation adjusting function; converting the new HSV values into corresponding RGB values; and outputting the RGB values.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
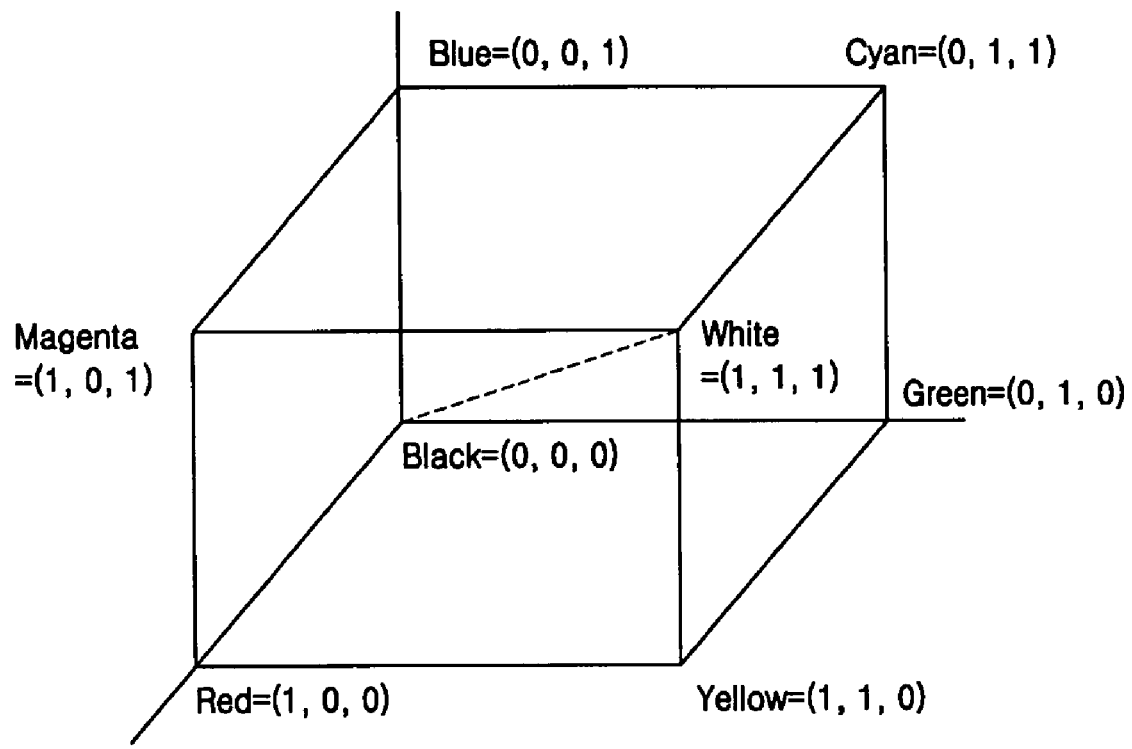
FIG. 1 is a view showing an RGB color space used for an RGB model.

The present invention and operational advantages thereof can be fully understood by referring to the accompanying drawings and explanations. Exemplary embodiments of the present invention will be described with reference to the accompanying drawings to explain the present invention in detail. In the drawings, the same reference numerals indicate the same elements.

Firstly, color models will be described for reference. Colors perceived by a human can be represented with some parameters in accordance with color models. The color models include CIE, RGB, HSV, YCrCb Model, and CMB models. The present invention directly relates to the RGB and HSV models.

In the RGB model, a color is implemented by combining three primary colors, that is, red, green, and blue colors, with a combination ratio. In the RGB model, a color corresponds to a point in an RGB space shown in FIG. 1. Colors, in the RGB model, can be represented with RGB coordinates (R, G, B) of the point in the RGB color space. Here, R, G, and B values are in a range of 0 to 1. For example, the RGB coordinates of the three primary colors, that is, red, green, and blue colors are (1, 0, 0), (0, 1, 0), and (0, 0, 1), respectively. In addition, the RGB coordinates of the yellow, cyan, magenta, black, and white colors are (1, 1, 0), (0, 1, 1), (1, 0, 1), (0, 0, 0), and (1, 1, 1), respectively. The R, G, and B values of a color represent amounts of red, green, and blue colors added to form the color. The RGB model is sometimes referred to as an additive model because a color is formed by adding the three primary colors.

On the other hand, in the HSV model, a color can be represented with three parameters: hue; brightness; and color saturation. Humans perceive color by analyzing light transmitted to the eyes. The hue corresponds to a dominant wavelength of light (color). The brightness corresponds to an intensity or amplitude of light (color). The color saturation corresponds to a purity or bandwidth of light (color).

Figure 2:
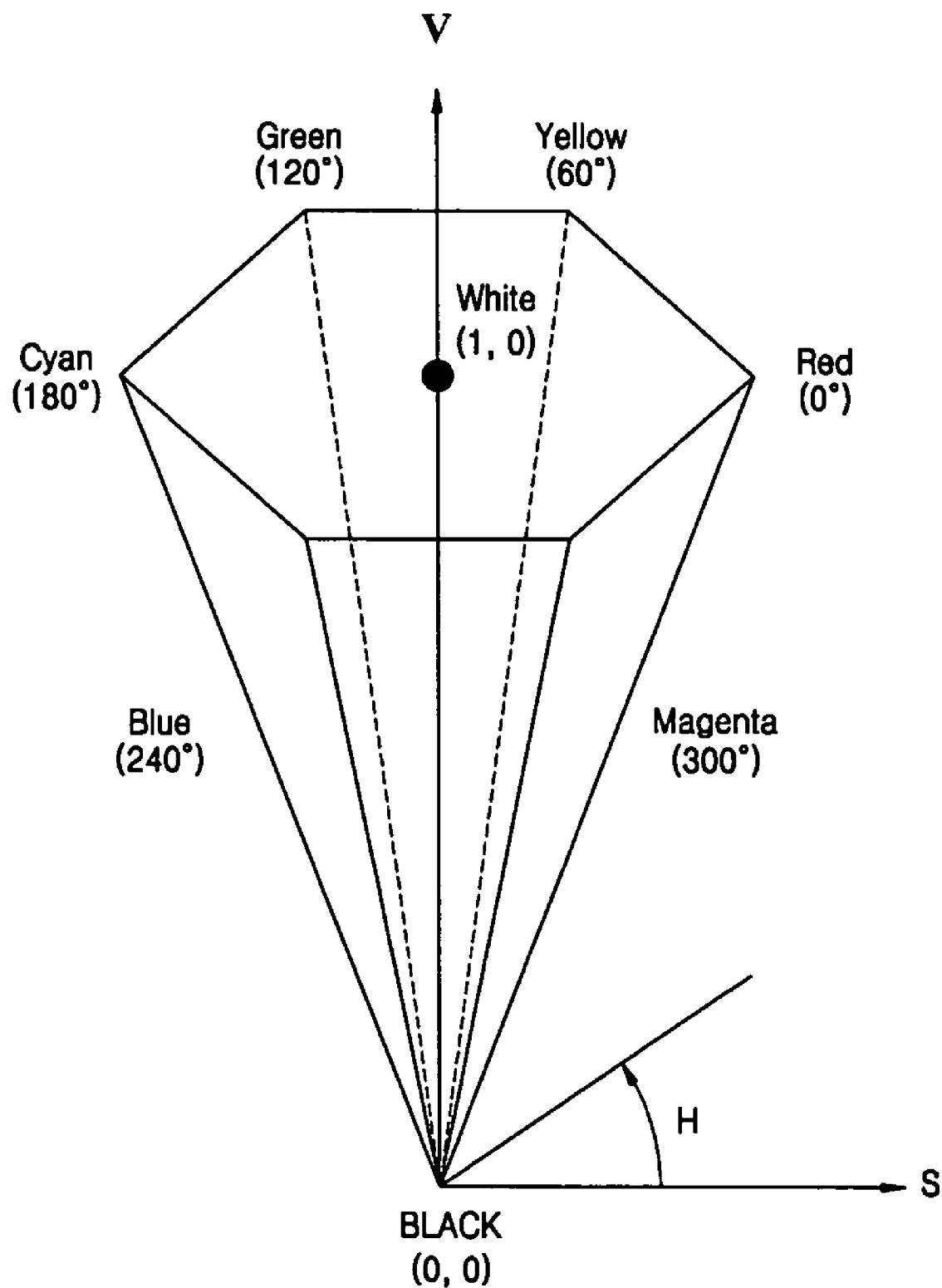
FIG. 2 is a view showing an HSV color space used for an HSV model.

FIG. 2 is a view showing an HSV color space used for an HSV model. A hue H of a color can be represented with an angle of the color on a color wheel. The hues of red, yellow, green, cyan, blue and magenta colors correspond to the angles of 0°, 60°, 120°, 180°, 240°, and 300°, respectively. As wavelength of a color becomes longer, the angle approaches 0° on the color wheel. The color saturation value S represents purity of a color. In the HSV color space of FIG. 2, if a color has a maximum color saturation value of 1, the color is referred to as a fully saturated color; if a color has a minimum color saturation value of 0, the color is referred to as a completely desaturated color.

The brightness V represents the intensity of a color. In the HSV color space of FIG. 2, if the brightness V of a color is 1, the color is at maximum brightness; and if the brightness V of a color is 0, the color is the darkest color, that is, black color.

Since a color can be uniquely represented with three parameters of the RGB model as well as the HSV model, the RGB values and the HSV values of the color are able to be converted to and from each other by a conversion formula.

Equation 1 is a general conversion formula used to convert RGB values to corresponding HSV values for analog colors.

$$RGBmax = MAX(R, G, B)$$
$$RGBmin = MIN(R, G, B)$$
$$Delta = RGBmax - RGBmin$$
$$V = RGBmax$$
$$S = 1.0 - RGBmin/RGBmax$$
$$H = \text{if } (R=V)(G-B)/Delta$$
$$\text{if } (G=V)\ 2+(B-R)/Delta$$
$$\text{if } (B=V)\ 4+(R-G)/Delta$$
$$\text{if } (H<0)\ H = H+6 \qquad \text{[Equation 1]}$$

Here, the R, G, B, S, and V values are in a range of 0 to 1; the H value is in a range of 0 to 6.

Since Equation 1 is used for analog colors, it is necessary to modify Equation 1 in order to deal with digital colors. Equation 2 is the conversion formula used for the digital colors.

$$RGBmax = MAX(R, G, B)$$
$$RGBmin = MIN(R, G, B)$$
$$Delta = RGBmax - RGBmin$$
$$V = RGBmax$$
$$S = 512 - (RGBmin*512)/RGBmax$$
$$H = \text{if } (R=V)(G-B)*128/Delta$$
$$\text{if } (G=V)\ 256+(B-R)*128/Delta$$
$$\text{if } (B=V)\ 512+(R-G)*128/Delta$$
$$\text{if } (H<0)\ H = H+768 \qquad \text{[Equation 2]}$$

Here, the R, G, and B values are in a range of 0 to 255; the H value is in a range of 0 to 768 which is more wide in order to represent subtle angles; the S value is in a range of 0 to 512; and the V value is in a range of 0 to 255. The R, G, B, H, S, and V values are integers.

Figure 3:
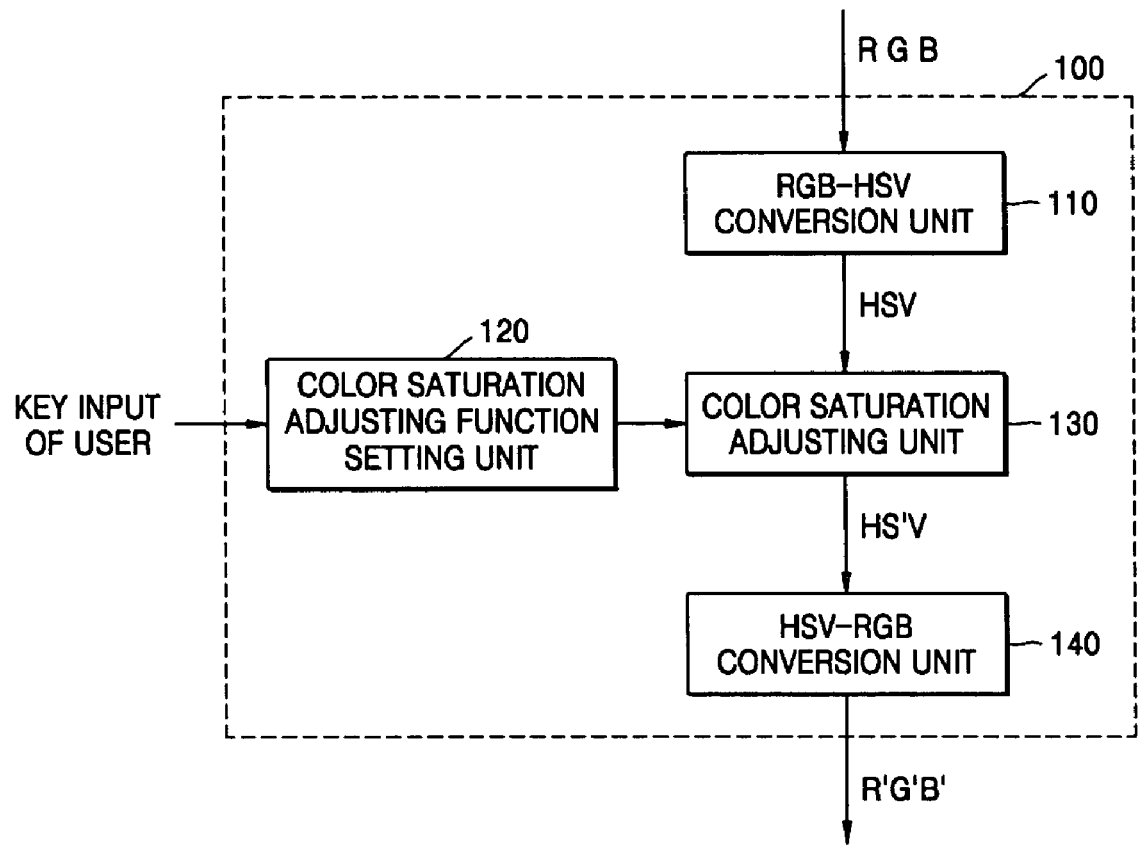
FIG. 3 is a block diagram showing a color saturation adjusting apparatus according to an exemplary embodiment of the present invention.

FIG. 3 is a block diagram showing a color saturation adjusting apparatus 100 according to an exemplary embodiment of the present invention. The color saturation adjusting apparatus 100 comprises an RGB-HSV conversion unit 110, a color saturation adjusting function setting unit 120, a color saturation adjusting unit 130, and an HSV-RGB conversion unit 140.

The RGB-HSV conversion unit 100 receives an input RGB image signal and converts RGB values of the input RGB image signal into corresponding HSV values. The aforementioned Equation 2, for example, is used for the RGB-HSV conversion.

If a user wants to adjust the color saturation of an image shown on a screen, the user opens a color saturation adjusting menu on the screen, for example, by manipulating a remote controller or an operating button provided on the body of a display system. Next, the user inputs color saturation adjusting values for specific hues (colors) through the color saturation adjusting menu by using key input. The color saturation adjusting function setting unit 120 sets a color saturation adjusting function in response to the key input of the user.

It is not practical for the user to input the color saturation adjusting values for all the hues. Therefore, practically, the user inputs the color saturation adjusting values for some representative hues, and the color saturation adjusting value for other intermediate hues between the representative hues are obtained by an interpolation method, as described later. For example, the user inputs color saturation adjusting values for red, yellow, green, cyan, blue, and magenta colors, which are located in an equal interval on the HSV color space of the HSV model.

The color saturation adjusting value is a gain (GAIN) for color saturation, which is in a range of 0 to 255. In the exemplary embodiment, a scaling factor of 64 exists. Therefore, if the color saturation adjusting value is 64, the original color saturation value is preserved. If the color saturation adjusting value is larger or smaller than 64, the color saturation value increases or decreases, respectively.

As described above, the user opens a color saturation adjusting menu on the screen by manipulating a remote controller or an operating button provided on the body of a display system. Next, the user inputs color saturation adjusting values for representative hues through the color saturation adjusting menu by using a key input. The key input may be performed by directly typing desired color saturation adjusting values or by adjusting length of sliding bars displayed on the screen with, for example, left and right arrow keys. The color saturation adjusting values set by the user are input to the color saturation adjusting function setting unit 120.

The color saturation adjusting value for the intermediate hues between the representative hues are obtained by interpolating two color saturation adjusting values of two representative hues adjacent to each of the intermediate hues by using an interpolation function. Like this, the user inputs the color saturation adjusting value for a few representative hues, and then, the color saturation adjusting function setting unit 120 sets the color saturation adjusting function to correspond the color saturation adjusting values to all the hues including the intermediate hues.

The interpolation function may be a predetermined function. Alternatively, the interpolation function may be selected from among candidate interpolation functions by the user. In other words, the menu for the color saturation adjustment may comprise sub-menus for inputting the color saturation adjusting values for a few representative hues and selecting the interpolation function.

Figure 4:
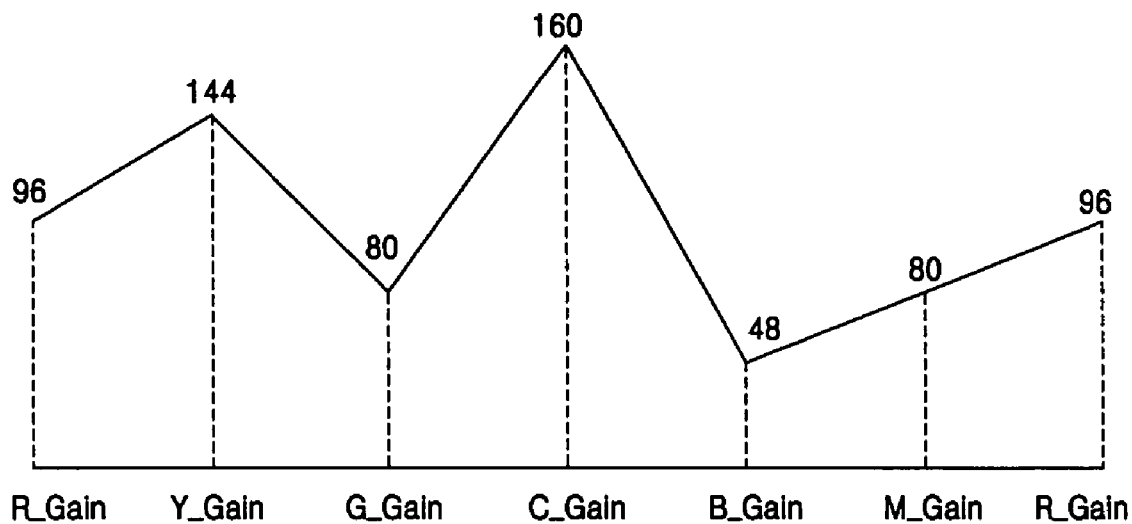
FIG. 4 is a graph showing an example of a color saturation adjusting function used for the color saturation adjusting apparatus according to an exemplary embodiment of the present invention.

FIG. 4 is a graph showing an example of the color saturation adjusting function used for the color saturation adjusting apparatus according to an exemplary embodiment of the present invention. In FIG. 4, R_Gain (=96), Y_Gain (=144), G_Gain (=80), C_Gain (=160), B_Gain (=48), and M_Gain (=80) are the color saturation adjusting values for the representative hues of red, yellow, green, cyan, blue, and magenta colors input by the user. The color saturation adjusting values for the intermediate hues between the representative hues are obtained by using the linear functions as the interpolation functions. The linear functions are depicted with straight lines between points corresponding to two adjacent color saturation adjusting values.

The graph depicted in FIG. 4 is represented by Equation 3.

if (H<128) Gain1=R_Gain;

Gain2=Y_Gain;

H_Basic=0;

else if (H<256) Gain1=Y_Gain;

Gain2=G_Gain;

H_Basic=128;

else if (H<384) Gain1=G_Gain;

Gain2=C_Gain;

H_Basic=256;

else if (H<512) Gain1=C_Gain;

Gain2=B_Gain;

H_Basic=384;

else if (H<640) Gain1=B_Gain;

Gain2=M_Gain;

H_Basic=512;

else if (H<640) Gain1=M_Gain;

Gain2=R_Gain;

H_Basic=640;

if (Gain1>Gain 2)

GAIN=(Gain1−Gain2)*(H_Basic+128−H)/128+Gain2;

else

GAIN=(Gain2−Gain1)*(H−H_Basic)/128+Gain1    [Equation 3]

After the color saturation adjusting value GAIN corresponding to the H values are obtained, in the color saturation adjusting unit 130, new color saturation values OUT_S are calculated by applying the color saturation adjusting function to the original color saturation value S while the H and V values are fixed.

More specifically, in the color saturation adjusting unit 130, the new color saturation values OUT_S are obtained by using Equation 4.

$$OUT\_S = S*GAIN/64 \quad \text{[Equation 4]}$$

The numeral 64 in Equation 4 is the aforementioned scaling factor of an embodiment of the present invention. In this exemplary embodiment, since the color saturation adjusting value GAIN is in a range of 0 to 255, the new color saturation value OUT_S can increase 4 (=256/64) times the original color saturation value S. In addition, since the original color saturation value S has a maximum of 512, the new color saturation value OUT_S beyond 512 is clipped (=cut off) into the maximum value of 512.

The H, OUT_S, V values obtained by adjusting the original color saturation values S in the color saturation adjusting unit 130 are converted into new RGB values in the HSV-RGB conversion unit 140 as shown in FIG. 3. The HSV-RGB conversion unit 140 outputs the new RGB values.

Equation 5 is a general conversion formula used to convert HSV values into RGB values for analog colors. Here, the R, G, B, S, and V values are in a range of 0 to 1; and the H value is in a range of 0 to 6.

tmp=(int)H $f=H-tmp$ $p=V*(1-S)$ $q=V*(1-(S*f))$ $t=V*(1-S*(1-f))$ if (tmp=0) R=V, G=t, B=p if (tmp=1) R=q, G=V, B=p if (tmp=2) R=p, G=V, B=t if (tmp=3) R=p, G=q, B=V if (tmp=4) R=t, G=p, B=V if (tmp=5) R=V, G=p, B=q    [Equation 5]

Since Equation 5 is used for analog colors, it is necessary to modify Equation 5 in order to represent digital colors. Equation 6 is the conversion formula used for the digital colors according to an embodiment of the present invention.

if (OUT_S=0) R=G=B=V else if (H>=640) f=H−640, tmp=5 else if (H>=512) f=H−512, tmp=4 else if (H>=384) f=H−384, tmp=3 else if (H>=256) f=H−256, tmp=2 else if (H>=128) f=H−128, tmp=1 else f=H, tmp=0

$p=V*(512-OUT\_S)/512$ $q=(OUT\_S*f)/128$ $q=V*(512-q)/512$ $t=(OUT\_S*(128-f))/128$ $t=V*(512-t)/512$ if (tmp=0) R=V, G=t, B=p if (tmp=1) R=q, G=V, B=p if (tmp=2) R=p, G=V, B=t if (tmp=3) R=p, G=q, B=V if (tmp=4) R=t, G=p, B=V if (tmp=5) R=V, G=p, B=q  [Equation 6]

Figure 5:
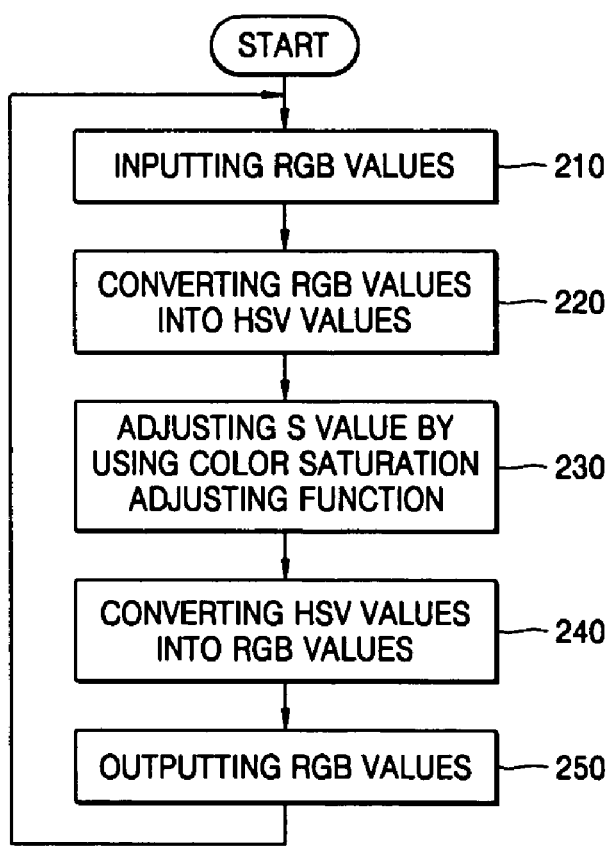
FIG. 5 is a flowchart showing a color saturation adjusting method according to an exemplary embodiment of the present invention.

FIG. 5 is a flowchart showing a color saturation adjusting method according to an exemplary embodiment of the present invention. The color saturation adjusting method may be used for a display system, and comprises: an operation 210 of receiving an input RGB image signal; an operation 220 of converting RGB values of the input RGB image signal into HSV values; an operation 230 of setting a color saturation adjusting function by a user and generating new HSV values in which color saturation values are varied from the color saturation values of the original HSV values by using the color saturation adjusting function; an operation 240 of converting the new HSV values into RGB values; and an operation 240 of outputting the RGB values.

In the color saturation adjusting function, it is preferable that representative hues correspond to color saturation adjusting values input by the user, and other intermediate hues between the representative hues correspond to color saturation adjusting values obtained by interpolating two color saturation adjusting values of two representative hues adjacent to each of the intermediate hues by using an interpolation function.

In addition, the interpolation function may be a predetermined function. Alternatively, the interpolation function may be selected from among candidate interpolation functions by the user.

In addition, the interpolation function may be a linear function, which can be simply and inexpensively implemented.

According to the color saturation adjusting apparatus and method of the present invention, since color saturation values for desired hues can be selectively and differently adjusted, it is possible to satisfy users having different color preferences.

In addition, since color saturation values for hues can be selectively and differently adjusted, it is possible for a user to correct unbalance in colors of a source image.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A color saturation adjusting apparatus used for a display system, comprising:

an RGB-HSV conversion unit receiving an input RGB image signal and converting RGB values of the input RGB image signal into corresponding HSV values;

a color saturation adjusting function setting unit setting a color saturation adjusting function in response to an input of a user;

a color saturation adjusting unit generating new HSV values in which color saturation values are varied from color saturation values of the corresponding HSV values based on the color saturation adjusting function; and an HSV-RGB conversion unit converting the new HSV values generated by the color saturation adjusting unit into corresponding RGB values and outputting the corresponding RGB values, wherein a plurality of color saturation adjusting values corresponding to a plurality of representative hues are input by the user and other color saturation adjusting values corresponding to intermediate hues between the representative hues are obtained by interpolating the color saturation adjusting values of the representative hues by using an interpolation function.

2. The color saturation adjusting apparatus according to claim 1, wherein the interpolation function is a predetermined function.

3. The color saturation adjusting apparatus according to claim 2, wherein the interpolation function is a linear function.

4. The color saturation adjusting apparatus according to claim 1, wherein the interpolation function is selected by the user from among candidate interpolation functions.

5. The color saturation adjusting apparatus according to claim 1, wherein the color saturation values are varied while the hue and brightness values are fixed.

6. The color saturation adjusting apparatus according to claim 1, wherein the plurality of representative hues correspond to red, yellow, green, cyan, blue, and magenta colors.

7. The color saturation adjusting apparatus according to claim 1, wherein the color saturation adjusting values are gains for color saturation values.

8. The color saturation adjusting apparatus according to claim 1, wherein color saturation adjusting values corresponding to intermediate hues between the representative hues are obtained by interpolating two color saturation adjusting values of two representative hues adjacent to each of the intermediate hues by using a linear interpolation function.

9. A color saturation adjusting method used for a display system, comprising:

receiving an input RGB image signal;

converting RGB values of the input RGB image signal into corresponding HSV values;

setting a color saturation adjusting function;

generating new HSV values in which color saturation values are varied from color saturation values of the corresponding HSV values based on the color saturation adjusting function;

converting the new HSV values into corresponding RGB values;

outputting the corresponding RGB values; and displaying an image in accordance with the outputted corresponding RGB values, wherein a plurality of color saturation adjusting values corresponding to a plurality of representative hues are input by the user and other color saturation adjusting values corresponding to intermediate hues between the representative hues are obtained by interpolating the color saturation adjusting values of the representative hues by using an interpolation function.

10. The color saturation adjusting method according to claim 9, wherein the interpolation function is a predetermined function.

11. The color saturation adjusting method according to claim 10, wherein the interpolation function is a linear function.

12. The color saturation adjusting method according to claim 9, wherein the interpolation function is selected by the user from among candidate interpolation functions.

13. The color saturation adjusting method according to claim 9, wherein the color saturation values are varied while the hue and brightness values are fixed.

14. The color saturation adjusting method according to claim 9, wherein the plurality of representative hues correspond to red, yellow, green, cyan, blue, and magenta colors.

* * * * *

UNITED STATES PATENT AND TRADEMARK OFFICE
CERTIFICATE OF CORRECTION

PATENT NO.       : 7,583,838 B2
APPLICATION NO. : 10/924871
DATED            : September 1, 2009
INVENTOR(S)      : Jae-moon Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Fourteenth Day of September, 2010

David J. Kappos
*Director of the United States Patent and Trademark Office*